United States Patent
Kolodner et al.

(10) Patent No.: US 6,912,553 B1
(45) Date of Patent: *Jun. 28, 2005

(54) VIRTUAL MACHINE MEMORY MANAGEMENT

(75) Inventors: Elliot Karl Kolodner, Haifa (IL); Martin John Trotter, Romsey (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/356,532

(22) Filed: Jul. 19, 1999

(30) Foreign Application Priority Data

Dec. 23, 1998 (GB) .............................................. 9828334

(51) Int. Cl.[7] .......................... G06F 12/00; G06F 17/30
(52) U.S. Cl. ...................................... 707/206; 711/147
(58) Field of Search .............................. 707/206, 1, 7, 707/103; 718/104, 107; 717/158, 148, 153, 134, 106, 132; 711/132, 170, 153, 173; 709/100, 106

(56) References Cited

U.S. PATENT DOCUMENTS

| | | | | |
|---|---|---|---|---|
| 5,088,036 A | * | 2/1992 | Ellis et al. ................... | 707/206 |
| 5,566,321 A | * | 10/1996 | Pase et al. ................... | 711/153 |
| 5,652,883 A | * | 7/1997 | Adcock ....................... | 707/206 |
| 5,692,193 A | * | 11/1997 | Jagannathan et al. ....... | 709/106 |
| 5,761,670 A | * | 6/1998 | Joy .......................... | 707/103 R |
| 5,848,423 A | * | 12/1998 | Ebrahim et al. ............. | 707/206 |
| 5,924,093 A | * | 7/1999 | Potter et al. ................. | 707/7 |
| 5,953,736 A | * | 9/1999 | O'Conner et al. ........... | 711/6 |
| 5,966,702 A | * | 10/1999 | Fresko et al. ............... | 707/1 |
| 6,028,999 A | * | 2/2000 | Pazel ........................ | 717/134 |
| 6,253,215 B1 | * | 6/2001 | Agesen et al. .............. | 707/206 |
| 6,289,360 B1 | * | 9/2001 | Kolodner et al. ........... | 707/206 |
| 6,304,949 B1 | * | 10/2001 | Houlsdworth ............... | 711/170 |
| 6,308,315 B1 | * | 10/2001 | Dice et al. .................. | 717/106 |
| 6,317,869 B1 | * | 11/2001 | Adl-Tabatabai et al. .... | 717/132 |
| 6,351,794 B1 | * | 2/2002 | Spilo et al. ................. | 711/173 |
| 6,757,891 B1 | * | 6/2004 | Azagury et al. ............ | 717/158 |

FOREIGN PATENT DOCUMENTS

EP 0574884 12/1993 .......... G06F/12/02

* cited by examiner

*Primary Examiner*—John Follansbee
*Assistant Examiner*—Dustin Nguyen
(74) *Attorney, Agent, or Firm*—Michael J. Buchenhorner; Casey P. August

(57) ABSTRACT

This invention relates to memory management in a virtual machine or operating system and in particular to object creation and garbage collection. There is described a method and system of managing memory in a multi-threaded processing environment such as a java virtual machine comprising: creating an object in a thread heap; associating a status with the object and setting the status as local; using write barriers to change the status to global if the object is assigned to a static variable or if the object is assigned to a field in a global object; changing the status of all objects referenced by that object to global; and performing garbage collection by deleting from the thread heap, when memory space in the thread heap is required, one or more local objects which can not be traced to the thread stack.

17 Claims, 6 Drawing Sheets

VIRTUAL MACHINE MEMORY MANAGEMENT

FIELD OF INVENTION

This invention relates to memory management in a multithreaded runtime environment.

BACKGROUND OF INVENTION

The Java programming language has its origins in a project undertaken by Sun Microsystemss to develop a robust programming environment that would meet the technical challenges of the consumer device software environment. The original consumer device projects were eventually abandoned but the Java programming language found itself being used on the World Wide Web to enable cross platform operation of programs downloaded from the internet. It is simple to use having similar features to C++ such as the basic object orientated technology but without some of the more complex features.

Typically, Java applications (source code) are compiled by the Javac compiler into Java byte code (intermediary code or pseudo object code) which can be loaded and executed by a Java Virtual Machine (JVM) (see FIG. 1). The JVM provides an instruction set, memory management and program loading capability that is independent of the hardware platform on which it has been implemented. The Java application source code is compiled into architecture independent byte code and the byte code is interpreted by a JVM on the target platform. Java is designed to be portable and follows some defined portability standards, which intend the source code to be "write once, run anywhere". The Java byte code may be further compiled into machine code (object code) for the target platform at which point the architectural independent nature of Java is lost.

The JVM is a software computing machine, effectively it simulates a hardware machine that processes Java byte code. The byte code is interpreted and processed by a JVM such as an Windows JVM running on a Intel personal computer platform. The JVM includes components for loading class files, interpreting the byte code, garbage collecting redundant objects, and for managing multiple processing threads. The JVM may also include a Just-In-Time compiler to transform some or all the byte code into native machine code.

Multithreading is a feature built into the Java language to allow users to improve interactive performance by allowing operations to be performed while continuing to process user actions. Multithreading is similar to multitasking, but whereas multitasking allows many applications to run on the same system in several processes, multithreading allows many routines (threads) in one application to potentially run in parallel within one process.

Garbage collection is the term used for describing how program objects are automatically discarded by the system after they are no longer useful.

For further information on garbage collection see Chapter 1 of 'Garbage Collection' by H Jones & R Lins, Wiley. Chapter 4 deals with Mark & Sweep techniques.

Many current implementations of Java use the classic mark-sweep-compact method of garbage collection as delivered in the base SUN JVM. References to the objects that are being processed at any instant by the system are stored in the registers, one or more thread stacks and some global variables. The totality of objects that may be needed by the system can be found by tracing through the objects directly referenced in the registers, stacks, and global variables and then tracing through these "root" objects for further references. The objects in use by a system thereby form a graph rooted at the root objects and any extraneous objects are not part of this graph. Once all the objects in the graph are found, the remaining objects in the heaps may be discarded (garbage collected).

The traditional mark and sweep garbage collection method is described below in terms of pseudo code with respect to a single heap:

Stop all threads causing the active registers for each thread to be stored in its stack Trace all stacks for object references—the local roots Trace all global variables object references—the global roots Trace through root set for references until no new object references (the sum of the local and global roots is the root set).

Delete all objects in the single heap that are not referenced

Note that in a particular Java virtual machine the term 'global variables' may include variables in classes, the global JNI table, objects awaiting finalisation and strings which have been 'interned'.

There are problems with this technique in a multithreaded and long running environment. The first problem is that in order to garbage collect all the threads must be stopped in order to work out what objects are unreachable (i.e., there are no pointers to them in the global or local variables and no pointers to them in other reachable objects). Various authors have attempted to solve this problem. One approach is an on-the-fly collector, which does not stop all threads, however, it cannot compact the reachable objects leading to fragmentation. Another approach are the generational scavenging schemes, which is to reduce the size of the set of traced objects by concentrating effort on the most recently allocated objects; however, these schemes must stop all of the threads. In an ideal world we would like to achieve a collector which works independently on all threads and compacts the local heap of the threads to maximise the free space available.

Another solution attempts to achieve this in a language (ML) other than Java by taking advantage of immutable objects which can be placed in thread-local heaps. An immutable object is non-modifiable and when such an object become reachable globally a copy of the object can be made in the global heap. Clearly this technique is only applicable to languages defining immutable objects.

Another approach moves an object into the global heap on first use. The difficulty here is that in order to move the object, references from elsewhere to it must be updated; in an environment where objects are referenced by handles this is made easier although there are still cases where objects cannot be moved.

Unfortunately handles bring their own problems and the IBM ports of the JVM have removed handles to improve performance and remove the need to subdivide the heap into handles and object spaces.

SUMMARY OF INVENTION

According to one aspect of the invention there is provided a method of managing memory in a multi-threaded processing environment including respective local thread stacks and heaps and a global heap, said method comprising:

creating an object in a thread heap; and monitoring whether the object is reachable from anywhere other than the thread stack or registers.

Preferably the method further comprises: associating a local status with the object; and changing the status of the object to global under certain conditions.

More preferably the method further comprises deleting from the thread heap one or more local objects when they are not reachable from a local root.

Advantageously where reachability is determined by tracing from the local root.

More advantageously the status of an object in the thread heap is changed to global if the object is assigned to a static variable or if the object is assigned to a field in a global object.

Hence this proposal concentrates on the case of implementing a thread local heap which has not been done before. In essence the solution is to keep track of object references using write barriers placed in any operation which assigns references eg putfield, putstatic and aastore.

The putfield operation for example is a java bytecode which causes the value on the top of the stack to be placed in the object referenced below it on the stack. The object field to be updated is defined by the constant pool reference (2 bytes) which follows the bytecode. See p.325 'Java Virtual Machine Specification', Lindholm & Yellin 1997.

A flag is associated with each object in the heap. In practice the flag is easily provided by ensuring that all objects on the heap are allocated on an 8 byte boundary ensuring that the low three bits are 0. Two of these bits are currently used to denote pinned or free objects leaving a spare flag which we use to denote 'global'. When an object is allocated it is generally placed in a piece of storage associated with the allocating thread; the thread local heap. The global flag is unset at this point. From now on the write barriers implement the following rules:

1) if an object reference is assigned to a static (global) variable the object becomes global and all objects reachable from it also become global; and 2) if a reference to a non-global object is assigned to another object which is global then the referenced object and all objects that are reachable from it also becomes global.

Thus at any point the thread local heap will contain objects which have the global flag unset and some which have the flag set. Any objects with the flag unset can be garbage collected by the thread itself. The objects marked global must at this stage be treated as reachable, pinned objects; they must not be moved or deleted. Any garbage collection policy can be adopted including compaction for the objects in the local heap, the only constraint is that we must of course compact into the potentially fragmented spaces left between the global objects. Note that the write barriers described above are extremely simple and can be implemented to have a very small effect on performance.

At some point the global objects will be moved from the local heaps into the global heap and this must be done using the current collection approach of stopping all threads. The belief is of course that the frequency of such events can be dramatically reduced and the work to be done also reduced. The global objects need to be removed and put in their own heap, once that is done the individual threads can be left to continue any tidying they need to do on their own heaps. The great improvement is that the moving of global objects is the only part which must be done whilst all program threads are stopped. Tidying of the local heaps can be then done in parallel. The current approach forces the compaction of the entire heap (moving objects) to be done by one thread and all others must wait for completion.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
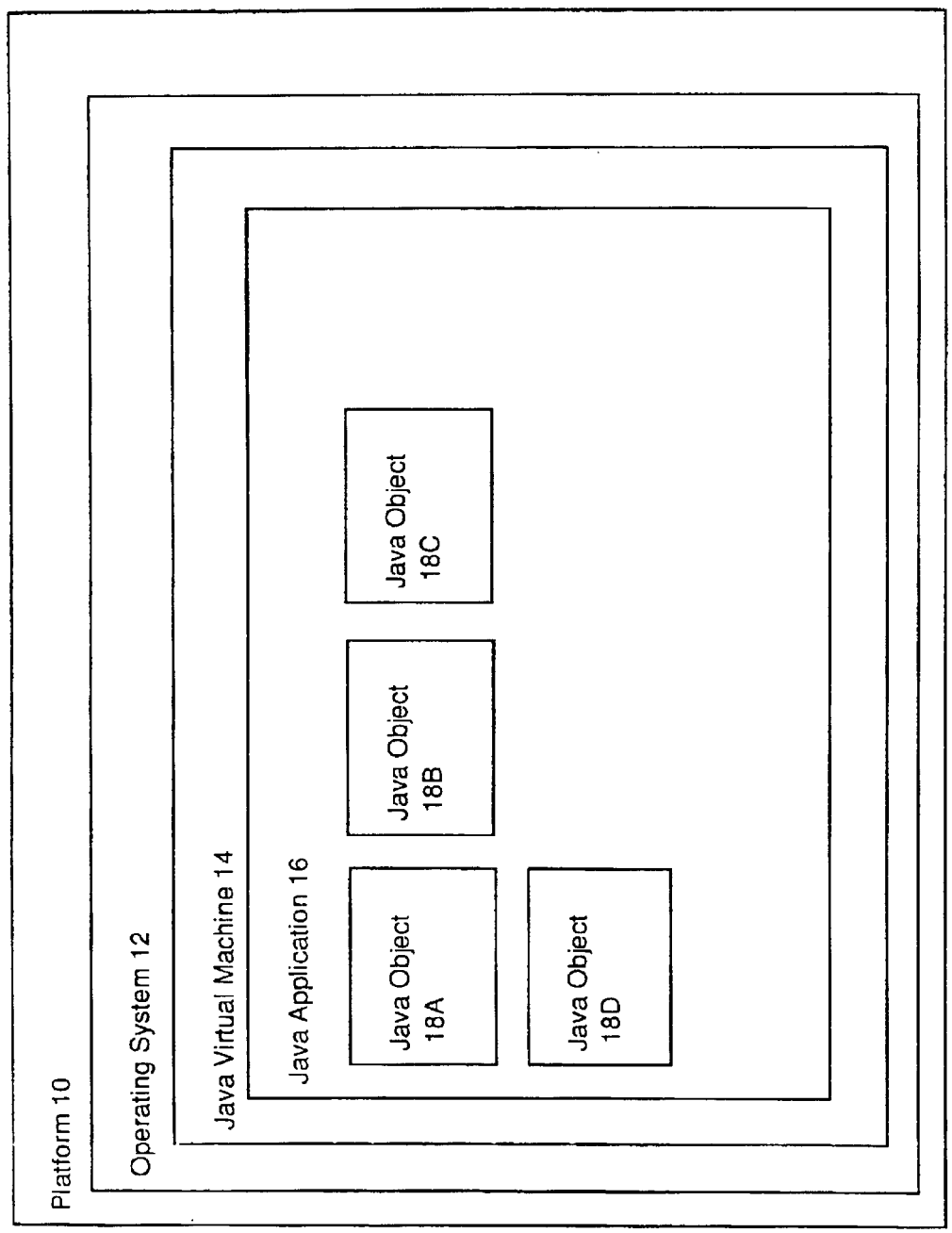
FIG. 1 is a schematic representation of a platform supporting the embodiment of the present invention.

Referring to FIG. 1, there is shown a computer platform 10 such as a Pentium processor based PC typically comprising a motherboard with processor, a 32 Mbytes RAM memory, and interface circuitry; a 4 G Byte hard drive; a 20× CD ROM; an SVGA monitor; a keyboard and a mouse. On power-on the platform loads into the memory an operating system 12 such as Windows NT v4 and subsequently a Java Virtual Machine (JVM) based on the Java Development Kit (JDK) v1.1 or v1.2. The Java virtual machine is capable of loading a Java application 16 from disk into memory so that the application may be executed on the platform 10. The Java application 16 is object orientated program code and creates Java language objects 18A, 18B, 18C, and 18D. An example of how the objects are built by the JVM is described with reference to FIG. 3.

Figure 2:
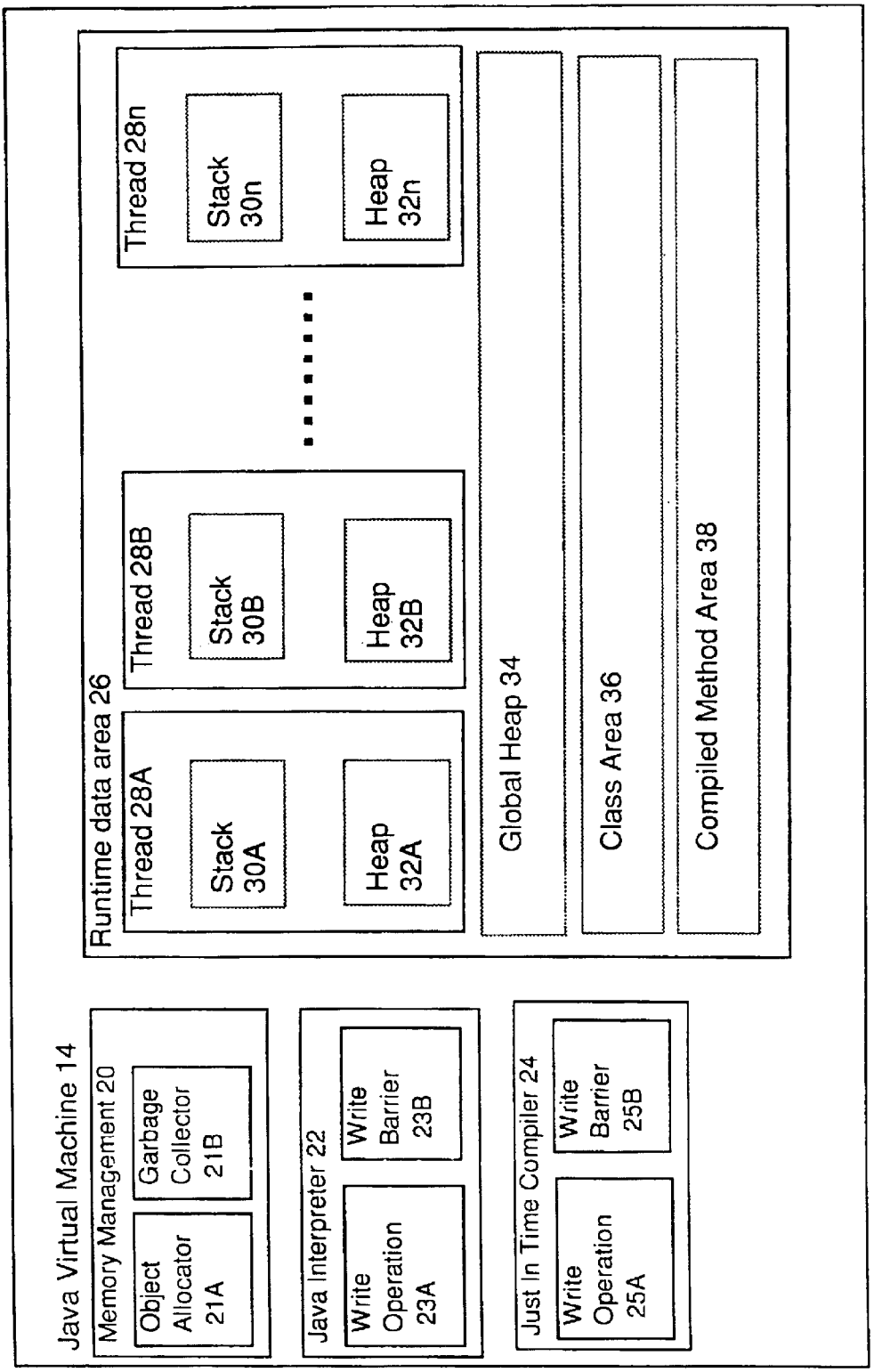
FIG. 2 is a schematic representation of a Java Virtual Machine embodying the invention.

The JVM 14 comprises code components for the multitude of tasks it has to perform (see FIG. 2). The components of relevance to the present embodiment comprise memory manager 20, Java interpreter 22 and just-in-time compiler 24. In operation the JVM creates memory space, the runtime data area 26, for storing the The runtime data area 26 comprises thread memory space 28A, 28B, 28n, global heap 34, class area 36 and compiled method area 38. The thread memory space 28 ideally stores local thread objects, local thread execution data and also objects marked global. Local objects are objects which are used by one thread alone and are not common between. Thread objects are stored in thread heaps 32A, 32B, 32n and thread execution data including object references and register data are stored in the thread stacks 30A, 30B, 30n. The global heap 34 stores objects which are common to more than one thread, that is, global objects. A local object which is loaded into a thread heap 32A for processing by thread 28A may become global if it is later used by another thread, say thread 28B, and may remain in the thread heap 28A or be moved to the global heap 34 by 'stop everything'. Class area 36 stores the classes as they are loaded into the JVM, classes are defined as global because they are common to all the threads hence any field of a class is globally reachable. An object, which is an instance of a class, is placed in a thread heap and is initially local because it may only be used by that thread. An exception is instance objects of class Thread or Runnable which are global at creation because they can be reached by other threads. Whereas an object referenced by a variable in a class is global because the object is reachable from the class which is reachable by all threads. The compiled method area 38 is used by the JIT compiler 24 to store native executable code compiled from the Java byte code.

The memory manager 20 includes an object allocator 21A and a garbage collector 21B which between them control the creation and deletion of objects within the thread heaps 32A, 32B, 32n and the global heap 34.

The Java interpreter 22 includes functionality to process the multitude of Java byte codes which make up the Java byte code function set. A write operation component 23A processes java write operations such as 'putfield', 'putstatic', 'aastore' using the operating system and microprocessor of the platform. Putfield and aastore are write operations which among other things assign a source object reference to a field in a target object. This means that the target object will contain a reference (or pointer) to the source object; the target object is the object that will be updated by the putfield operation. Putstatic assigns an object reference to a static variable in a class. A write barrier component 23B checks the status of the target object and assigns a local or global status to the source object depending on certain rules:

1) if an object reference (of a source object) is assigned to a static variable of a class the source object becomes global and all objects reachable from it also become global; and 2) if a non-global source object is assigned to a reference in a target object which is global then the referenced source object and all objects that are reachable from it become global.

The Java write operation 'putfield' may set a field within a target object to point at a source object using the operating system commands or platform operations. A 'putfield' write operation 23A together with the write barrier 23B is described below in pseudo platform code with comments.

If field to be updated in target object is of 'reference' type.
if (target is global) (Check to see to the global flag is set for the target
if (source is not global) {If so check to see if the source has already been set global
set source to global {If not already set then set source to global
set objects reachable by source to global {and set all objects reachable,(i.e., directly referenced by source object or referenced from another object reachable from the source object by the source object to global
set slot (target, field number, source) {sets a field variable within a target object to point at a source object.

The last instruction code is the write operation 23A whereas the instructions before that constitute the write barrier 23B. Similar pseudo code may be provided for the putstatic and aastore java commands, and other JVM actions, which store references in objects.

The JIT compiler 24 is similar to the Java interpreter 22 in that it contains a write operation component 25A and a write barrier component 25A. However instead of interpreting java byte code in the methods of objects and processing the operations in real time, native code similar to the pseudo code above is created and stored in the compiled method area 38 for execution directly by the platform and operating system whenever that particular method is invoked.

Figure 3:
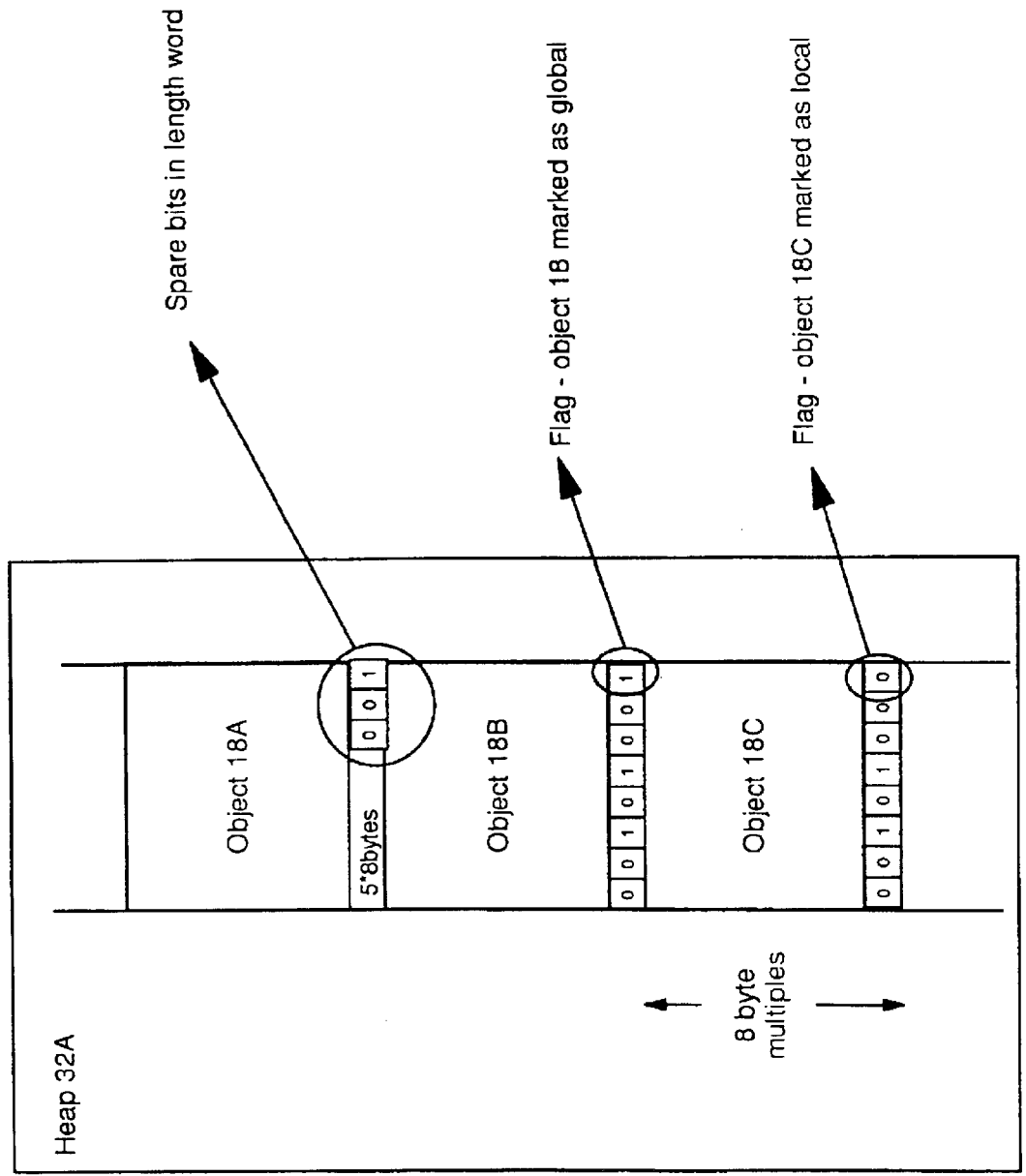
FIG. 3 shows the structure of objects in a thread heap.

Objects 18 are stored in the thread heaps 32 using multiples of 8 bytes (see FIG. 3). Each object has a length word attached which identifies the length of the object in bytes and allows objects in the heaps to be scanned sequentially from the start of the heap. The length word (4 bytes long in the embodiment) has three spare bits available because of the 8 byte alignment boundary and one of these bits is used as a flag for the object to store the local or global status. In the embodiment shown in FIG. 3 each of the objects is 40 bytes long which is 5*8 bytes or '00101000' bytes in binary; the last three '000' being spare. This is indicated at the high end of the word in each case. The low end of the word is spare and thus the first bit of the length word is used to indicate the local/global status, in this case object 18A and 18B are set to '1' to indicate that they are global and 18C is set to '0' to indicate that it is local.

Figure 4:
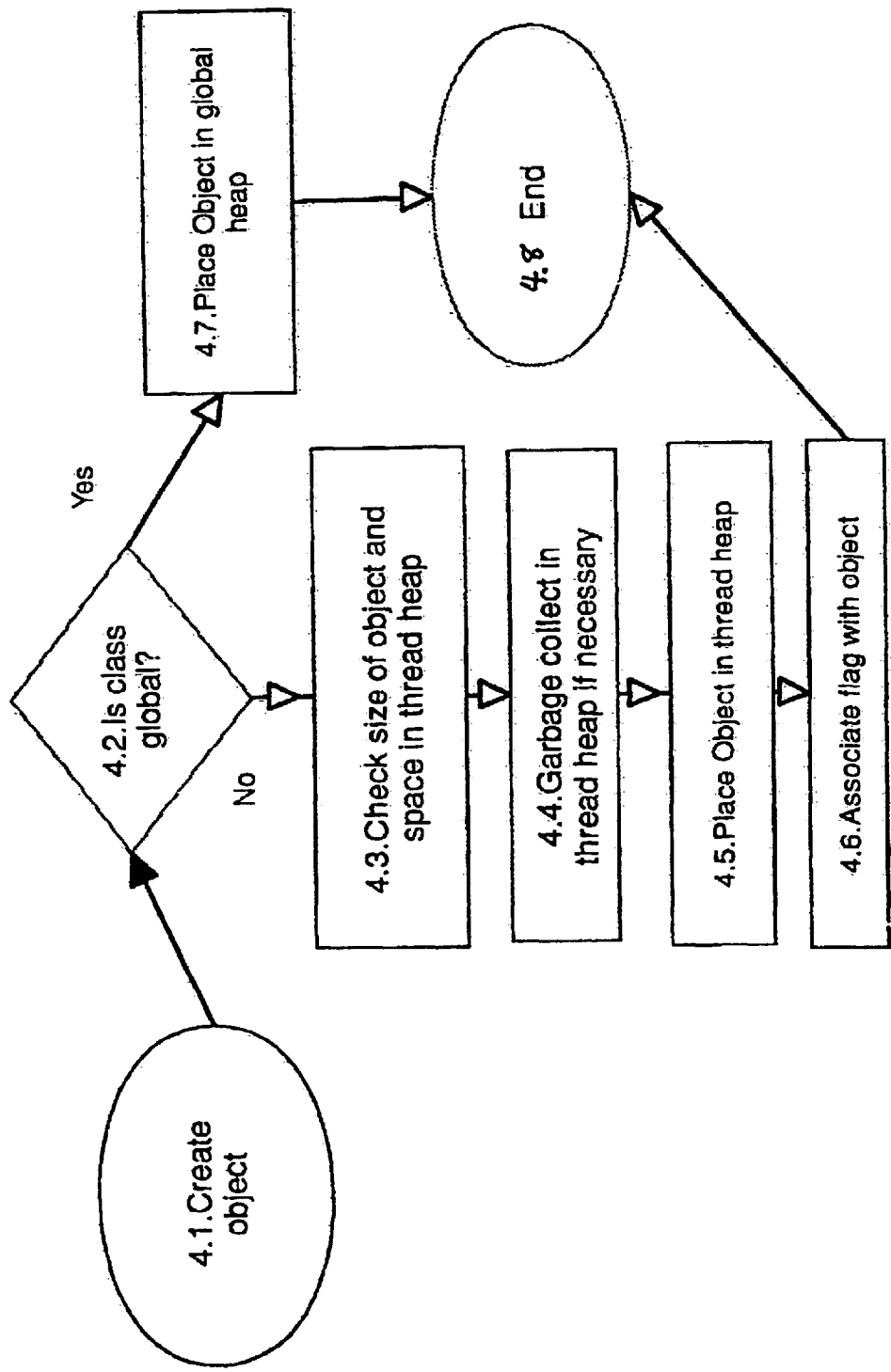
FIG. 4 is a flow diagram depicting the memory management process of the invention.

The process of memory management is described with reference to FIG. 4. Step 4.1 creates an object from a class stored in the class area 36. Step 4.2 checks to see if the class is a 'global' class, i.e., a class all of whose instances are global or one whose instances we expect to quickly become global, whereby the object is assigned global and/or placed in the global heap (Step 4.7). Step 4.3 calculates the size of the object to see whether it will fit in the thread heap. Step 4.4 performs garbage collection to free up memory if there is not enough space. Step 4.5 places the object in the thread heap memory along with the object length in multiples of eight. Step 4.6 uses a spare bit in the length attribute as a flag and set as local ('0'). The process ends at step 4.8.

Figure 5:
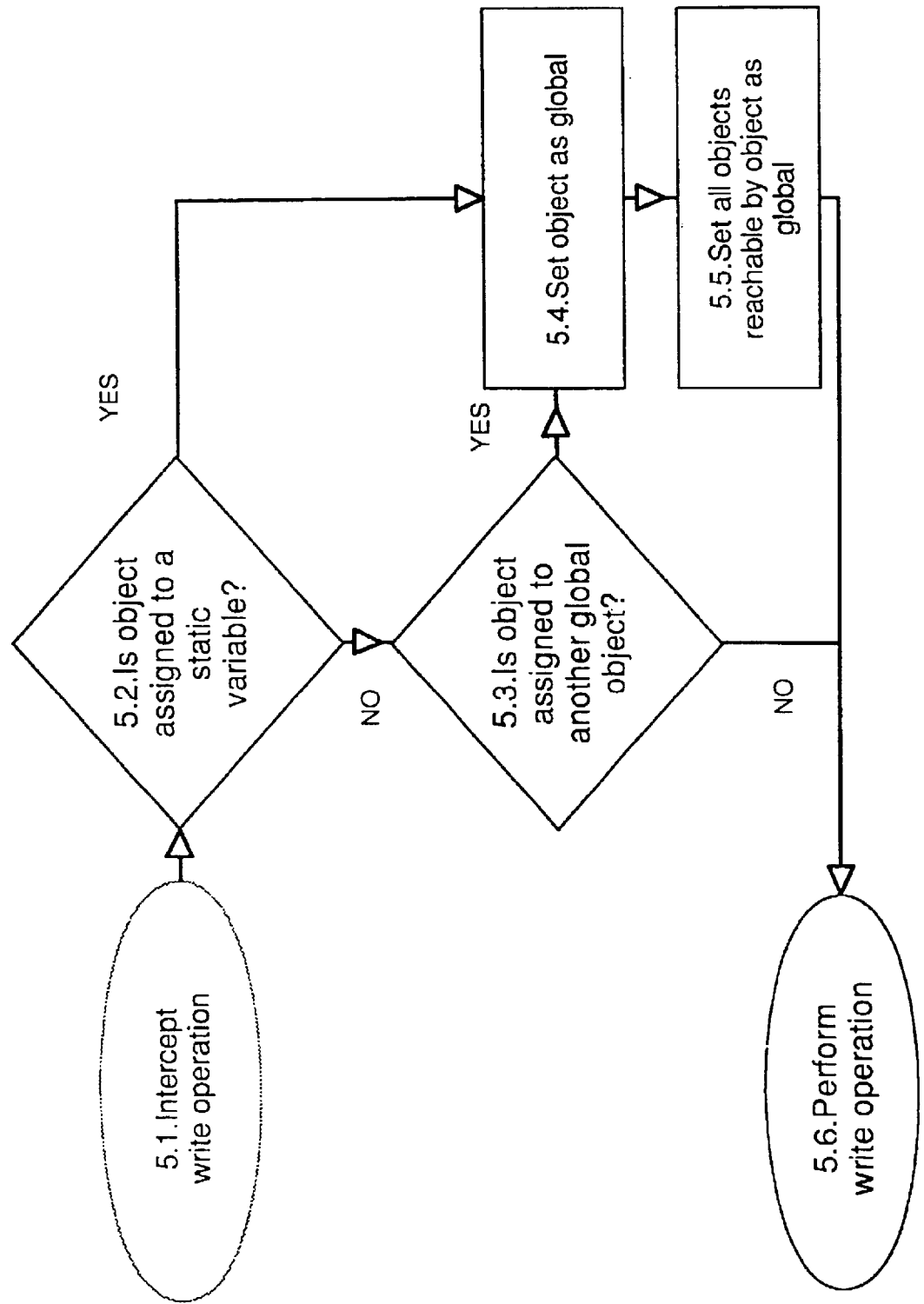
FIG. 5 is a flow diagram of the process of the write barrier.
Figure 6:
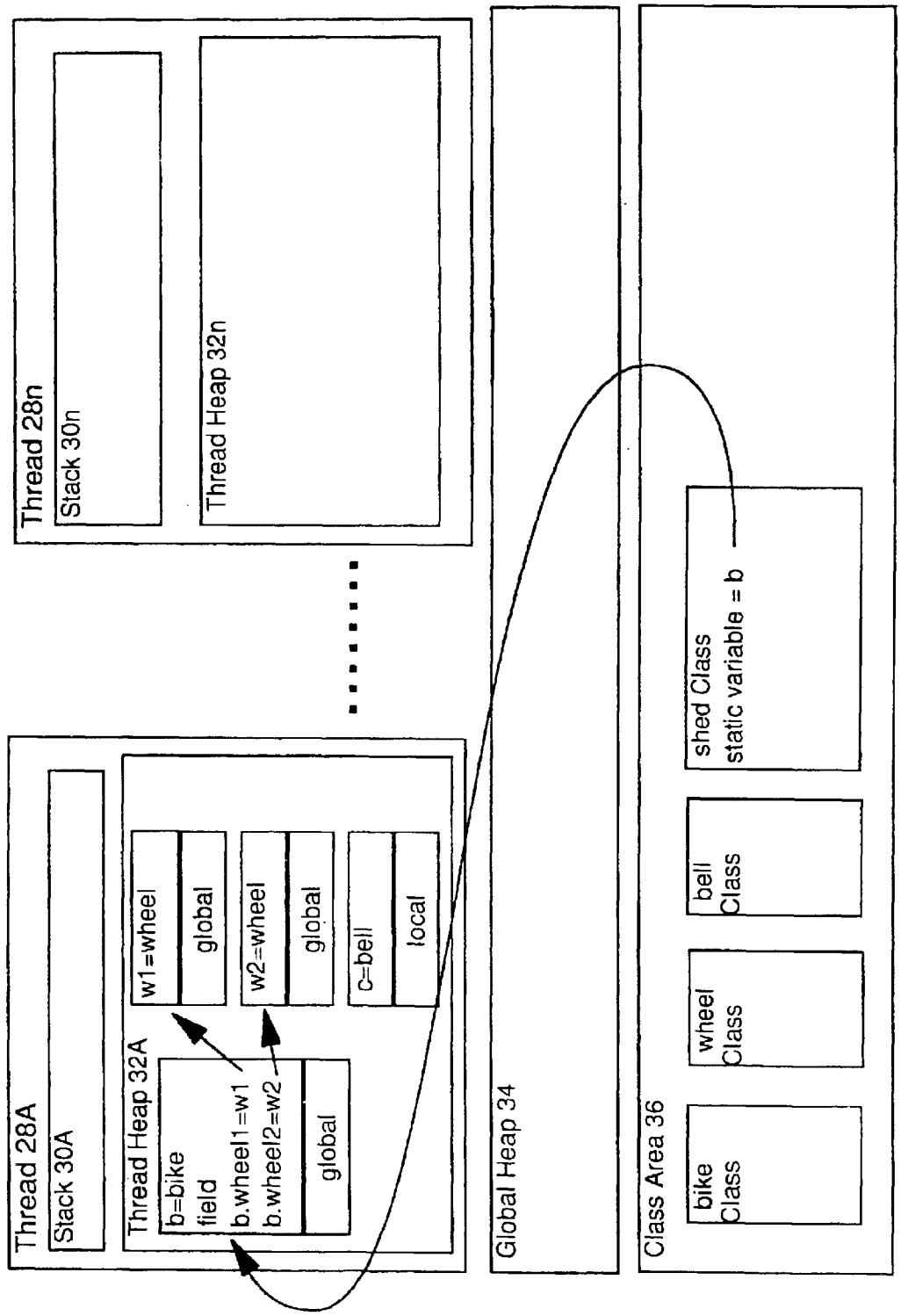
FIG. 6 is a schematic representation of objects in a thread heap and the global heap of the JVM.

The write operation and write barrier process are described with reference to FIG. 5. In Step 5.1 a write operation is called and intercepted by the write barrier which is integrated with the write operation code. Step 5.2 checks whether the object is being assigned to a static variable of a class and if so set the status of the object as global (step 5.4) and set all objects reachable by the object as global (step 5.5) before moving to step 5.6, if not so then do step 5.3. Step 5.3 checks whether the write operation assigns the object to another global object, if so set the status of the object as global (step 5.4) and set all objects reachable by the object as global (step 5.5). Once complete continue with the write operation.

The garbage collector 21A for single thread garbage collection is described in terms of pseudo code with comments.

Trace stack in thread {Identify objects in use by the thread—these are held in the thread stack
Trace reference objects {Identify objects referenced directly and indirectly by the stack objects.
Delete unused objects {those objects in the heap which are not identified in trace or are not identified as global
Check heap size {If not enough memory then increase size of the local heap. If not desirable or possible then do 'full' garbage collection Full garbage collection is traditional Mark/Sweep performed with all other threads stopped. During full garbage collection global objects are moved from local to the global heap if possible. Object movement is not possible if conservative tracing is performed and the object is referenced directly from the stack because of the uncertainty of the tracing.

The Java language pseudo code program below (together with comments) creates objects representing a bike with two wheels and a bell in a local thread which is put into a global shed. The bike and wheels are make global whereas the bell remains local. If a further new bike object were to be created and the thread heap had no more memory then the garbage collector would mark and sweep the bell object so long as it was not pointed to by the stack.

```
// Demonstrate the Thread local heap in action.
// For simplicity all niceties such as constructors
have been omitted and the example
    // made deliberately unreal to illustrate the basic
point. Objects generally start life
    // local and become global by assignment.
    // This is a fake class just to illustrate a static
variable in operation.
class Shed { // This is a fake class just to illustrate
a static variable in operation.
static Bike;
        // The main method will run the sample code to
illustrate creation of local
            // objects which later will become global.
            public static void main (String args[ ]) {
            Bike b = new Bike( ); // build a new Bike object
                    // The Bike class is loaded and
initialised and an instance of Bike is created in the
local heap. It is marked 'local'.
            Bell c = new Bell( );     // build a new Bell object.
The Bell class is loaded and initialised and an instance
of Bell is created in the local heap. It is marked
'local'
            Wheel w = new Wheel( );   // build a new wheel
object. The Wheel class is loaded and initialised and an
instance of Wheel is created in the local heap. It is
marked 'local'.
            b.wheel1 = w; // Assign the first wheel of the bike
Java bytecode putfield, write barrier detects that target
(b) is local and hence w remains local.
            Shed.bike = b;    // Assign b to the static field
in bike Shed. Java bytecode putstatic is used and thus b
is marked global. Since w is reachable from b then w is
also marked global
            w = new Wheel( );   // build another new wheel
object. Another instance of Wheel is created in the
local heap. It is marked 'local'.
            b.wheel2 = w;    // Assign the second wheel of the
bike
                    // Java bytecode putfield, write
barrier detects that target (b) is global and hence w is
marked global also.
            // Note that at this point we have built a bike, two
wheels and a bell. The bell is the only object which is
still local since the bike has been assigned to the
static variable 'bike'.
            }
}
class Bike {
Wheel wheel1;
Wheel wheel2;
Bell bell1;
String name;
}
class Wheel {
int diameter;
}
class Bell {
int volume;
}
```

In summary there is described a method and system for memory management in a virtual machine or operating system and in particular an object creation and garbage collection method and system. There is described a method and system of managing memory in a multi-threaded processing environment such as a java virtual machine comprising: creating an object in a thread heap; associating a status with the object and setting the status as local; using write barriers to change the status to global if the object is assigned to a static variable or if the object is assigned to a field in a global object; changing the status of all objects referenced by that object to global; and performing garbage collection by deleting from the thread heap, when memory space in the thread heap is required, one or more local objects which can not be traced to the thread stack.

The platform in the embodiment does not need to be pentium based nor is restricted to the hardware stated. Any platform which is capable of supporting JDK v1.1 or v1.2 would be capable of supporting the virtual machine of embodiment. Although the embodiment is described with reference to a Java Virtual Machine it is not necessarily so restricted to a virtual machine but may be used in any environment where storage is garbage collected to free up memory in that environment. For example, such an environment could be an multithreaded Lisp runtime or the runtime for some other multithreaded garbage collected language.

Although we have described in the preferred embodiment the local/global status as a field in the object it may be implemented in other ways for instance as a separate table.

Java and Java-based marks are trademarks or registered trademarks of Sun Microsystems, Inc.

Microsoft, Windows, and Windows NT are trademarks of Microsoft Corporation.

Now that the invention has been described by way of a preferred embodiment, various modifications and improvements will occur to those person skilled in the art. Therefore it should be understood that the preferred embodiment has been provided as an example and not as a limitation.

What is claimed is:

1. A method of managing memory in a multi-threaded processing environment including local thread stacks and local thread heaps, and a global heap, said method comprising:

creating an object in a thread heap;

for a given thread, monitoring each object in its heap, to determine whether the object is accessible by any thread other than the given thread;

assigning a status to the given object, the status designating the object as a local object;

changing the status of the object to global when the monitoring step determines that the object is accessible from either of a global root or other global object; and deleting from the thread heap one or more local objects when it is determined that they are not accessible from a local root or other global object.

2. The method as claimed in claim 1, further comprising changing the status of an object in the thread heap to global if the object is assigned to a static variable or if the object is assigned to a field in a global object.

3. The method as claimed in claim 1, further comprising intercepting assignment operations to an object in the thread heap to determine whether the object status should be changed.

4. The method as claimed in claim 3 wherein the multi-threaded processing environment is a virtual machine.

5. The method as claimed in claim 4 wherein the virtual machine comprises an interpreter comprising a write operation code modified to perform a checking of assignment of the object.

6. The method as claimed in claim 5 wherein the virtual machine comprises a just in time compiler wherein native compiled write operation code includes native code to perform the checking of assignment of the object.

7. The method as claimed in claim 6 further comprising using spare capacity in an object header for the status.

8. The method as claimed in claim 7 further comprising using multiples of two or more bytes in a thread heap to store the objects whereby there is at least one spare bit in the object length variable and using the at least one spare bit as the status.

9. The method as claimed in claim 8 further comprising moving objects whose status is global from the thread heap to the global heap.

10. The method as claimed in claim 9, further comprising compacting the reachable local objects in a thread heap.

11. The method as claimed in claim 1 wherein certain objects are associated with a global status on creation thereof.

12. The method as claimed in claim 11 where said certain objects include class objects.

13. The method as claimed in claim 11 further comprising the step of analysing whether an object is likely to be made global and associating such an object with a global status on creation.

14. The method as claimed in claim 13 further comprising allocating objects assigned as global on creation to the global heap.

15. A system for managing memory in a multi-threaded processing environment comprising:

respective local thread stacks and heaps;

a global heap;

means for creating an object in a thread heap;

means for monitoring each object in its heap, to determine whether the object is accessible by any thread other than the given thread means for associating a local status with the object and means for changing the status of the object to global under certain conditions;

means for changing the status of an object in the thread heap to global if the object is assigned to a static variable or if the object is assigned to a field in a global object; and means for deleting from the thread heap one or more local objects when it is determined that they are not accessible from a local root or other global object.

16. A computer program product stored on a computer readable storage medium for, when executed on a computer, performing a method of managing memory in a multi-threaded processing environment including local thread stacks and local thread heaps, and a global heap, said method comprising:

creating an object in a thread heap;

for a given thread, monitoring each object in its heap, to determine whether the object is accessible by any thread other than the given thread;

assigning a status with the object that designates the object as a local object;

changing the status of the object to global when the monitoring step determines that the object is accessible from either of a global root or other global object; and deleting from the thread heap one or more local objects when it is determined that they are not accessible from a local root or other global object.

17. The computer program product as claimed in claim 16 wherein the status of an object in the thread heap is changed to global if the object is assigned to a static variable or if the object is assigned to a field in a global object.

* * * * *